(12) United States Patent
Fisher

(10) Patent No.: US 11,847,649 B2
(45) Date of Patent: Dec. 19, 2023

(54) METHOD AND SYSTEM FOR MOBILE BANKING USING A SERVER

(71) Applicant: Michelle Fisher, Marina Del Rey, CA (US)

(72) Inventor: Michelle Fisher, Marina Del Rey, CA (US)

(73) Assignee: Michelle Fisher, Berkeley, CA (US)

( * ) Notice: Subject to any disclaimer, the term of this patent is extended or adjusted under 35 U.S.C. 154(b) by 1555 days.

(21) Appl. No.: 14/691,537

(22) Filed: Apr. 20, 2015

(65) Prior Publication Data
US 2015/0254634 A1 Sep. 10, 2015

Related U.S. Application Data

(63) Continuation of application No. 13/620,432, filed on Sep. 14, 2012, now Pat. No. 9,020,836, which is a (Continued)

(51) Int. Cl.
*G06Q 20/40* (2012.01)
*G06Q 20/04* (2012.01)
(Continued)

(52) U.S. Cl.
CPC ............ *G06Q 20/401* (2013.01); *G06Q 20/04* (2013.01); *G06Q 20/102* (2013.01); *G06Q 20/108* (2013.01); *G06Q 20/326* (2020.05); *G06Q 20/3223* (2013.01); *G06Q 20/3229* (2013.01); *G06Q 20/3278* (2013.01); *G06Q 20/3552* (2013.01); *G06Q 20/367* (2013.01); *G06Q 20/382* (2013.01); *G06Q 30/0238* (2013.01); *H04B 5/0031* (2013.01); *H04W 4/80* (2018.02);
(Continued)

(58) Field of Classification Search
CPC .. G06Q 20/401; G06Q 20/102; G06Q 20/108; G06Q 20/32; G06Q 20/3223; G06Q 20/3229; G06Q 20/3278; G06Q 20/3552; G06Q 20/367; G06Q 20/382; G06Q 30/0238; H04B 5/0031; H04W 4/008
USPC .......................................................... 705/40
See application file for complete search history.

(56) References Cited

U.S. PATENT DOCUMENTS

| 6,038,367 | A | 3/2000 | Abecassis |
| 6,101,483 | A | 8/2000 | Petrovich |

(Continued)

FOREIGN PATENT DOCUMENTS

WO WO 2006095212 A1 9/2006

OTHER PUBLICATIONS

U.S. Appl. No. 11/933,351, Office Action datted Oct. 3, 2008, 5 p.
(Continued)

*Primary Examiner* — Slade E Smith

(57) ABSTRACT

A method for transmitting data between a mobile communication device and a server. The method includes running a mobile application on the mobile communication device. The mobile application is hosted on the mobile communication device through the server as a Software as a Service (SaaS). The method further includes transmitting data associated with the mobile application between the mobile communication device and the server, in which transmission of the data between the mobile communication device and the server is monitored through the server.

23 Claims, 2 Drawing Sheets

Related U.S. Application Data continuation of application No. 11/939,821, filed on Nov. 14, 2007, now Pat. No. 8,290,433.

(51) Int. Cl.

| | | |
|---|---|---|
| *H04W 4/80* | (2018.01) | |
| *G06Q 20/32* | (2012.01) | |
| *G06Q 20/34* | (2012.01) | |
| *H04W 12/062* | (2021.01) | |
| *H04W 12/06* | (2021.01) | |
| *H04W 12/082* | (2021.01) | |
| *G06Q 20/36* | (2012.01) | |
| *G06Q 20/38* | (2012.01) | |
| *G06Q 20/10* | (2012.01) | |
| *H04B 5/00* | (2006.01) | |
| *G06Q 30/0238* | (2023.01) | |
| *H04W 88/06* | (2009.01) | |
| *H04L 9/40* | (2022.01) | |

(52) U.S. Cl.
CPC ....... *H04W 12/062* (2021.01); *H04W 12/068* (2021.01); *H04W 12/082* (2021.01); *G06Q 20/3226* (2013.01); *G06Q 20/3227* (2013.01); *G06Q 20/3821* (2013.01); *H04L 63/102* (2013.01); *H04L 2209/56* (2013.01); *H04W 88/06* (2013.01)

(56) References Cited

U.S. PATENT DOCUMENTS

| | | | |
|---|---|---|---|
| 6,115,601 A | 9/2000 | Ferreira | |
| 6,123,259 A | 9/2000 | Ogasawara | |
| 6,128,655 A | 10/2000 | Fields | |
| 6,141,666 A | 10/2000 | Tobin | |
| 6,199,082 B1 | 3/2001 | Ferrel | |
| 6,250,557 B1 | 6/2001 | Forslund | |
| 6,415,156 B1 | 7/2002 | Stadelmann | |
| 6,450,407 B1 | 9/2002 | Freeman | |
| 6,587,835 B1 | 7/2003 | Treyz | |
| 6,605,120 B1 | 8/2003 | Fields | |
| 6,771,981 B1 | 8/2004 | Zalewski | |
| 6,772,396 B1 | 8/2004 | Cronin | |
| 6,886,017 B1 | 4/2005 | Jackson | |
| 6,950,939 B2 | 9/2005 | Tobin | |
| 7,031,945 B1 | 4/2006 | Donner | |
| 7,069,248 B2 | 6/2006 | Huber | |
| 7,096,003 B2 | 8/2006 | Joao | |
| 7,110,744 B2 | 9/2006 | Freeny | |
| 7,110,792 B2 | 9/2006 | Rosenberg | |
| 7,127,236 B2 | 10/2006 | Khan | |
| 7,200,578 B2 | 4/2007 | Paltenghe | |
| 7,289,810 B2 | 10/2007 | Jagadeesan | |
| 7,308,254 B1 | 12/2007 | Rissanen | |
| 7,357,312 B2 | 4/2008 | Gangi | |
| 7,379,920 B2 | 5/2008 | Leung | |
| 7,472,829 B2 | 1/2009 | Brown | |
| 7,482,925 B2 | 1/2009 | Hammad | |
| 7,512,567 B2 | 3/2009 | Bemmel | |
| 7,522,905 B2 | 4/2009 | Hammad | |
| 7,784,684 B2 | 8/2010 | Labrou | |
| 7,870,077 B2 | 1/2011 | Woo | |
| 7,979,519 B2 | 7/2011 | Shigeta | |
| 8,005,426 B2 | 8/2011 | Huomo | |
| 8,019,362 B2 | 9/2011 | Sweatman | |
| 8,073,424 B2 | 12/2011 | Sun | |
| 8,086,534 B2 | 12/2011 | Powell | |
| 8,109,444 B2 | 2/2012 | Jain | |
| 8,121,945 B2 | 2/2012 | Rackley | |
| 8,127,984 B2 | 3/2012 | Zatloukal | |
| 2001/0011250 A1 | 8/2001 | Paltenghe | |
| 2001/0044751 A1 | 11/2001 | Pugliese | |
| 2001/0056402 A1* | 12/2001 | Ahuja | G07F 7/1008 705/43 |
| 2002/0049670 A1* | 4/2002 | Moritsu | G06Q 20/14 705/40 |
| 2002/0056091 A1 | 5/2002 | Bala | |
| 2002/0059100 A1 | 5/2002 | Shore | |
| 2002/0063895 A1 | 5/2002 | Agata | |
| 2002/0065774 A1 | 5/2002 | Young | |
| 2002/0077918 A1 | 6/2002 | Lerner | |
| 2002/0082879 A1 | 6/2002 | Miller | |
| 2002/0102963 A1 | 8/2002 | Heinonen | |
| 2002/0107756 A1 | 8/2002 | Hammons | |
| 2002/0120860 A1* | 8/2002 | Ferguson | H04W 8/18 726/5 |
| 2002/0160761 A1 | 10/2002 | Wolfe | |
| 2002/0169984 A1 | 11/2002 | Kumar | |
| 2002/0188565 A1 | 12/2002 | Nakamura | |
| 2003/0061113 A1 | 3/2003 | Petrovich | |
| 2003/0065805 A1 | 4/2003 | Barnes | |
| 2003/0074259 A1 | 4/2003 | Slyman | |
| 2003/0085286 A1 | 5/2003 | Kelley | |
| 2003/0087601 A1 | 5/2003 | Agam | |
| 2003/0093695 A1 | 5/2003 | Dutta | |
| 2003/0105641 A1 | 6/2003 | Lewis | |
| 2003/0132298 A1 | 7/2003 | Swartz | |
| 2003/0140004 A1 | 7/2003 | O'Leary | |
| 2003/0163359 A1 | 8/2003 | Kanesaka | |
| 2003/0172028 A1 | 9/2003 | Abell | |
| 2003/0191973 A1* | 10/2003 | Johnson | G06F 1/3228 713/300 |
| 2003/0210127 A1* | 11/2003 | Anderson | G06F 21/36 340/5.27 |
| 2004/0006497 A1 | 1/2004 | Nestor | |
| 2004/0030658 A1 | 2/2004 | Cruz | |
| 2004/0034544 A1 | 2/2004 | Fields | |
| 2004/0073497 A1 | 4/2004 | Hayes | |
| 2004/0127256 A1 | 7/2004 | Goldthwaite | |
| 2004/0153668 A1* | 8/2004 | Baier Saip | H04L 63/0846 726/5 |
| 2004/0235450 A1 | 11/2004 | Rosenberg | |
| 2004/0243519 A1 | 12/2004 | Perttila | |
| 2004/0254836 A1 | 12/2004 | Emoke Barabas | |
| 2004/0267618 A1 | 12/2004 | Judicibus | |
| 2004/0267665 A1* | 12/2004 | Nam | G06Q 20/341 705/41 |
| 2005/0003810 A1 | 1/2005 | Chu | |
| 2005/0021363 A1* | 1/2005 | Stimson | G06Q 20/105 705/41 |
| 2005/0027543 A1* | 2/2005 | Labrou | G06Q 20/02 705/26.35 |
| 2005/0040230 A1 | 2/2005 | Swartz | |
| 2005/0076210 A1 | 4/2005 | Thomas | |
| 2005/0165646 A1 | 7/2005 | Tedesco | |
| 2005/0187873 A1 | 8/2005 | Labrou | |
| 2005/0215231 A1 | 9/2005 | Bauchot | |
| 2006/0018467 A1* | 1/2006 | Steinmetz | H04L 9/32 380/54 |
| 2006/0020559 A1* | 1/2006 | Steinmetz | G07C 9/21 705/67 |
| 2006/0031174 A1* | 2/2006 | Steinmetz | G06Q 20/4014 705/67 |
| 2006/0031752 A1 | 2/2006 | Surloff | |
| 2006/0089874 A1 | 4/2006 | Newman | |
| 2006/0136334 A1* | 6/2006 | Atkinson | G06Q 20/326 705/28 |
| 2006/0143091 A1 | 6/2006 | Yuan | |
| 2006/0191995 A1 | 8/2006 | Stewart | |
| 2006/0206709 A1 | 9/2006 | Labrou | |
| 2006/0219780 A1 | 10/2006 | Swartz | |
| 2006/0224508 A1* | 10/2006 | Fietz | G06Q 40/02 705/40 |
| 2007/0004391 A1 | 1/2007 | Maffeis | |
| 2007/0011066 A1* | 1/2007 | Steeves | G06Q 20/3829 705/35 |
| 2007/0011099 A1 | 1/2007 | Sheehan | |
| 2007/0022058 A1 | 1/2007 | Labrou | |
| 2007/0075133 A1 | 4/2007 | Yeager | |
| 2007/0095892 A1 | 5/2007 | Lyons | |
| 2007/0125838 A1 | 6/2007 | Law | |
| 2007/0125840 A1 | 6/2007 | Law | |

(56) References Cited

U.S. PATENT DOCUMENTS

| | | |
|---|---|---|
| 2007/0138299 A1 | 6/2007 | Mitra |
| 2007/0143828 A1 | 6/2007 | Jeal |
| 2007/0131759 A1 | 7/2007 | Cox |
| 2007/0156436 A1 | 7/2007 | Fisher |
| 2007/0210155 A1 | 9/2007 | Swartz |
| 2007/0235519 A1 | 10/2007 | Jang |
| 2007/0255662 A1 | 11/2007 | Tumminaro |
| 2007/0270166 A1 | 11/2007 | Hampel |
| 2007/0293155 A1 | 12/2007 | Liao |
| 2008/0006685 A1* | 1/2008 | Rackley, III ............ G06Q 40/00 235/379 |
| 2008/0010190 A1* | 1/2008 | Rackley, III ........ G06Q 20/3223 705/39 |
| 2008/0010196 A1 | 1/2008 | Rackley |
| 2008/0017704 A1 | 1/2008 | Vandeburg |
| 2008/0294556 A1 | 1/2008 | Anderson |
| 2008/0040265 A1* | 2/2008 | Rackley, III .......... G06Q 20/102 705/40 |
| 2008/0045172 A1 | 2/2008 | Narayanaswami |
| 2008/0046366 A1 | 2/2008 | Bemmel |
| 2008/0048022 A1 | 2/2008 | Vawter |
| 2008/0051059 A1 | 2/2008 | Fisher |
| 2008/0051142 A1 | 2/2008 | Calvet |
| 2008/0052192 A1 | 2/2008 | Fisher |
| 2008/0052233 A1 | 2/2008 | Fisher |
| 2008/0059372 A1* | 3/2008 | Lee ....................... G06Q 20/425 705/41 |
| 2008/0066165 A1* | 3/2008 | Rosenoer ................ G06F 21/40 713/182 |
| 2008/0080411 A1* | 4/2008 | Cole ..................... H04W 48/16 370/328 |
| 2008/0080457 A1* | 4/2008 | Cole ..................... H04W 76/10 370/342 |
| 2008/0126145 A1* | 5/2008 | Rackley, III .......... G06Q 20/102 455/406 |
| 2008/0139155 A1 | 6/2008 | Boireau |
| 2008/0167988 A1 | 7/2008 | Sun |
| 2008/0177668 A1 | 7/2008 | Delean |
| 2008/0208681 A1 | 8/2008 | Hammad |
| 2008/0208743 A1 | 8/2008 | Arthur |
| 2008/0208744 A1 | 8/2008 | Arthur |
| 2008/0208762 A1 | 8/2008 | Arthur |
| 2008/0221997 A1 | 9/2008 | Wolfe |
| 2008/0255947 A1 | 10/2008 | Friedman |
| 2008/0275779 A1 | 11/2008 | Lakshminarayanan |
| 2008/0305769 A1* | 12/2008 | Rubinstein .............. G06F 21/35 455/411 |
| 2008/0305774 A1 | 12/2008 | Ramakrishna |
| 2009/0063312 A1 | 3/2009 | Hurst |
| 2009/0075592 A1 | 3/2009 | Nystrom |
| 2009/0098825 A1 | 4/2009 | Huomo |
| 2009/0104888 A1 | 4/2009 | Cox |
| 2009/0106112 A1 | 4/2009 | Dalmia |
| 2009/0124234 A1 | 5/2009 | Fisher |
| 2009/0132362 A1 | 5/2009 | Fisher |
| 2009/0143104 A1 | 6/2009 | Loh |
| 2009/0144161 A1 | 6/2009 | Fisher |
| 2009/0227281 A1 | 9/2009 | Hammad |
| 2010/0057619 A1 | 3/2010 | Weller |
| 2010/0063895 A1 | 3/2010 | Dominguez |
| 2010/0275010 A1* | 10/2010 | Ghirardi ............. H04L 63/0838 726/5 |
| 2011/0320316 A1 | 12/2011 | Randazza |

OTHER PUBLICATIONS

U.S. Appl. No. 11/939,821, Office Action dated Aug. 17, 2010, 11 p.
U.S. Appl. No. 11/933,351, Office Action dated Aug. 18, 2010, 16 p.
U.S. Appl. No. 11/933,321, Office Action dated May 27, 2010, 11 p.
"ViVOtech to Demonstrate Industry's First End-to-End Near Field Communication (NFC) Solution at the NRF Show." Business Wire: 1 Jan. 16, 2006. Business Dateline; Hoover's Company Profiles; ProQuest Central. Web. Oct. 5, 2012.
MCA Specification Standard, 2002.
U.S. Appl. No. 11/933,337, Office Action dated May 27, 2010, 9 p.
U.S. Appl. No. 11/933,351, Office Action dated Oct. 3, 2008, 5 p.
U.S. Appl. No. 11/933,367, Office Action dated May 27, 2010, 8 p.
U.S. Appl. No. 11/467,441, Office Action dated May 27, 2009, 17 p.
U.S. Appl. No. 12/592,581, Office Action dated Jun. 4, 2010, 20 p.
U.S. Appl. No. 11/933,351, Office Action dated Jul. 8, 2009, 7 p.
U.S. Appl. No. 15/134,101, Office Action dated Nov. 2017.
U.S. Appl. No. 14/219,223, Office Action dated Jul. 3, 2018.
Deena, M. Amato, "Mobile Rewards." Chain Store Age 82.5 (2006): 160, 161, 163. Hoover's Company Profiles; ProQuest Central. Web. Oct. 5, 2012.
Coupon . http://www.dictionary.com/browse/coupon?s=t.
URL https://en.wikipedia.org/wiki/URL.
"Text Messaging" https://en.m.wikipedia.org/wiki/Text_messaging.
"Text Based User Interface" https://en.wikipedia.org/wiki/User_interface.
"Web Browser" https://techterms.com/definition/web_browser.
"WAP" https://en.wikipedia.org/wiki/Wireless_Application_Protocol.
"Multimedia messaging" https://en.wikipedia.org/wiki/Multimedia_Messaging_Service#Technical_description.
Web based user interface https://en.wikipedia.org/wiki/User_interface.
Ajax https://techterms.com/definition/ajax.
Java script https://techterms.com/definition/javascript.
"Browser games" www.60freegames.com/Free-to-Play/Browser-Games.
"Online shopping" https://en.wikipedia.org/wiki/Online_shopping.
"Social networking services" https://en.wikipedia.org/wiki/Social_networking_service.
"Web mapping" https://en.wikipedia.org/wiki/Web_mapping.
"Mobile browser" https://en.wikipedia.org/wiki/Mobile_browser.
"Voice browser" https://en.wikipedia.org/wiki/Voice_browser.
"Email" https://techterms.com/definition/email.
"Web mail" https://en.wikipedia.org/wiki/Webmail ).
"WAP Browser" https://en.m.wikipedia.org/wiki/Wireless_Application_Protocol.
"Binary application" https://en.m.wikipedia.org/wiki/Application_binary_interface.

* cited by examiner

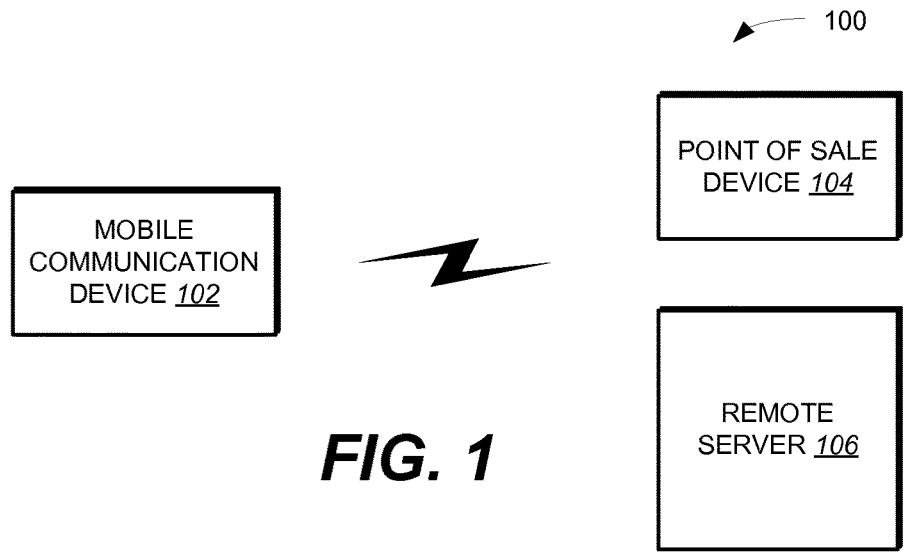
FIG. 1
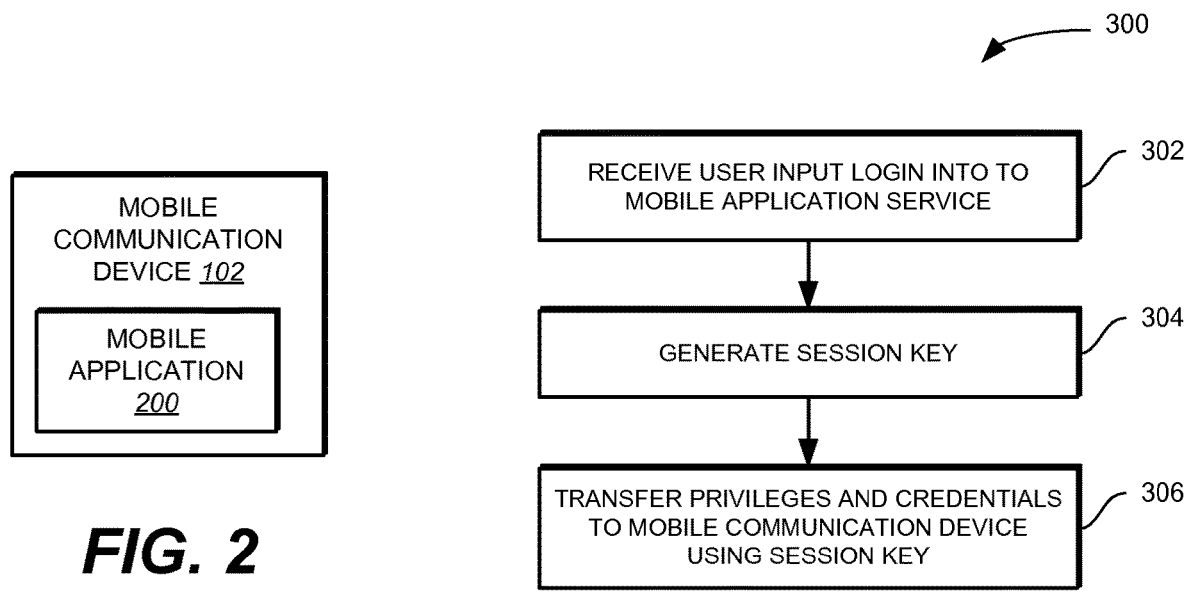
FIG. 2
FIG. 3

METHOD AND SYSTEM FOR MOBILE BANKING USING A SERVER

CROSS-REFERENCE TO RELATED APPLICATIONS

This application is a continuation and claims priority to U.S. patent application Ser. No. 13/620,432 filed on Sep. 14, 2012, titled, "METHOD AND SYSTEM FOR MOBILE BANKING USING A MOBILE APPLICATION" which is a continuation and claims priority to U.S. patent application Ser. No. 11/939,821, filed Nov. 14, 2007, titled, "METHOD AND SYSTEM FOR SECURING TRANSACTIONS MADE THROUGH A MOBILE COMMUNICATION DEVICE" which is now U.S. Pat. No. 8,290,433B, all of which is incorporated by reference herein in its entirety.

FIELD OF INVENTION

The present invention relates to data communications and wireless devices.

BACKGROUND OF THE INVENTION

Mobile communication devices—e.g., cellular phones, personal digital assistants, and the like—are increasingly being used to conduct payment transactions as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel, both of which are incorporated herein by reference. Such payment transactions can include, for example, purchasing goods and/or services, bill payments, and transferring funds between bank accounts. Given the sensitive nature of personal money or banking data that may be stored on a mobile communication device as a result of the ability to transact payments, it is critical to protect a user from fraudulent usage due to, e.g., loss or theft of a mobile communication device.

BRIEF SUMMARY OF THE INVENTION

In general, in one aspect, this specification describes a method for transmitting data between a mobile communication device and a server. The method includes running a mobile application on the mobile communication device. The mobile application is hosted on the mobile communication device through a management server. The method further includes transmitting data associated with the mobile application between the mobile communication device and the server, in which transmission of the data between the mobile communication device and the management server is monitored through the management server.

Implementations can include one or more of the following features. Transmitting data can include generating a session key that is only valid for a given communication session between the mobile communication device and the server. The method can further include disabling use of the mobile application running on the mobile communication device through the management server by invalidating the session key. The method can further include timing out a given communication session between the mobile communication device and the management server after a pre-determined amount of time to prevent theft of data that is accessible through the mobile application. Transmitting data associated with the mobile application between the mobile communication device and the management server can include prompting a user to enter a payment limit PIN in response to a pending purchase exceeding a pre-determined amount. The payment limit PIN can be applied to all purchases globally or on a per-payment basis. The method can include use of biometrics to authenticate the user before authorizing the transaction. The mobile application can comprise a payment transaction application that permits a user to perform one or more of the following services including bill payment, fund transfers, or purchases through the mobile communication device. The mobile application can permit a user to subscribe to each of the services separately.

The details of one or more implementations are set forth in the accompanying drawings and the description below. Other features and advantages will be apparent from the description and drawings, and from the claims.

BRIEF DESCRIPTION OF THE DRAWINGS

FIG. 1 illustrates one implementation of a block diagram of a communication system including a wireless mobile communication device.

FIG. 2 illustrates one implementation of the wireless mobile communication device of FIG. 1.

FIG. 3 illustrates one implementation of a method for authenticating a user.

Like reference symbols in the various drawings indicate like elements.

DETAILED DESCRIPTION OF THE INVENTION

Figure 4:
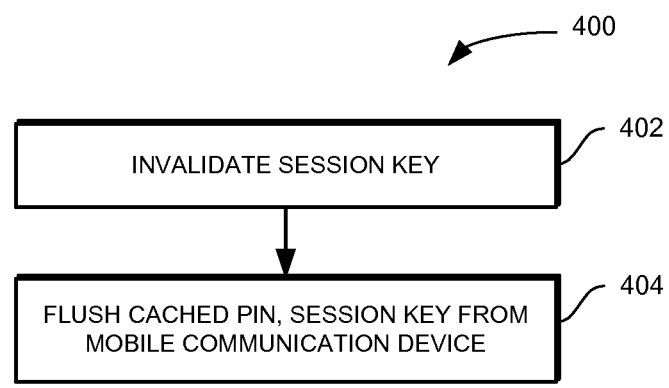
FIG. 4 illustrates one implementation of a method for remotely locking use of a mobile application on a mobile communication device.

FIG. 1 illustrates one implementation of a communication system 100. The communication system 100 includes a hand-held, wireless mobile communication device 102 a point-of-sale device 104 and a remote server 106. In one implementation, the mobile communication device 102 includes a mobile application (discussed in greater detail below) that permits a user of the mobile communication device 102 to conduct payment transactions. Payment transactions can include, for example, using contactless payment technology at a retail merchant point of sale (e.g., through point of sale device 104), using mobile/internet commerce (e.g., purchase tickets and products, etc.), storage of payment information and other digital artifacts (receipts, tickets, coupons, etc), storage of banking information (payment account numbers, security codes, PIN's, etc.), and accessing banking service (account balance, payment history, bill pay, fund transfer, etc.), and so on.

In one implementation, the mobile application running on the mobile communication device 102 implements one or more of the following tools to secure data that may be stored and presented on the mobile communication device 102 as a result of a payment transaction. The mobile application can implemented one the mobile communication device 102 through a management server which hosts and operates (either independently or through a third-party) the application for use by its customers over the Internet, or other wireless network (e.g., a private network), or a wired network. In one implementation, customers do not pay for owning the software itself but rather for using the software. In one implementation, the mobile application is accessible through an API accessible over the Web (or other network). The mobile application can include a multi-factored PIN-based login and authentication, and include session keys and have command-level authentication. In one implementation, the mobile application running on the mobile communication device 102 can be remotely locked through a remote server (e.g., remote server 106). In one implementation, a PIN request can be implemented to limit the amount of purchases that can be made. Further, security codes for different payment methods can be implemented to protect a user. Each of these tools is discussed in greater detail below.

FIG. 2 illustrates one implementation of the mobile communication device 102. The mobile communication device 102 includes a mobile application 200 that (in one implementation) is provided to the mobile communication device 102 through a remote server (e.g., remote server 106). In one implementation, the mobile application is a Mobile Wallet application available from Mobile Candy Dish, Inc., of Berkeley, Calif. Providing the mobile application as a hosted service enables central monitoring and management of all security aspects of the service at the remote server. In addition, data (corresponding to a payment transaction) can be stored on the remote server (e.g., remote server 106 (FIG. 1)) in a secure manner. In one implementation, the remote server is a management server that is can be maintained by Mobile Candy Dish or a trusted third party, as described in U.S. patent application Ser. No. 11/933,351. For example, the data can be securely stored on the remote server using conventional PCI guidelines. Hence, in the event the mobile communication device 102 is lost (or stolen), no confidential data can be recovered as no data is stored on the mobile communication device 102. In addition, an added benefit is that a user can recover seamlessly by syncing new mobile communication device (via new installation of the mobile application) with the service. Thus, in one implementation, sensitive information (e.g., banking account numbers, credit card account numbers, expiry dates, and so on) are never stored on the mobile communication device. This reduces risk and exposure of the user's private information and data.

Client Login and Authentication

In general, while effort is made to minimize storage of sensitive user information and data in a memory of a mobile communication device, in one implementation, some data is stored in the memory of a mobile communication device due to reasons of performance, usability and user experience. For example, data may need to be stored on a mobile communication device in the following circumstances. Payment credentials, coupons, tickets, and so on may have to be stored on the secure element of an NFC phone. Account balance, banking payment history, etc., may be locally cached on a mobile communication device. In one implementation, a user can opt-in to save payment method security codes in the client (or mobile application) for convenience. Tickets and/or coupons may be locally cached so that a user can redeem the tickets and/or coupons in an offline mode. For example, a mobile communication device may be offline in a situation in which network connectivity inside a building is degraded, and storing a ticket and/or coupon in a local cache of the mobile communication device permits the user to access the ticket or coupon.

In addition to data partitioning, in one implementation, users have an ability to subscribe to different services. For example, User A may subscribe to "Mobile Payments" and "Mobile Banking" services, while User B may only subscribe to "Mobile Banking" and "What's Nearby" services. Hence, in one implementation, the mobile application includes a mechanism to enable/disable different services on the Client based on particular services to which users are subscribed. Table 1 below illustrates example services that are enabled/disabled based on user subscriptions.

TABLE 1

| USER | SERVICE | SUBSCRIPTION STATUS |
| --- | --- | --- |
| User A | Money Manager | Disabled |
| User B | Money Manager | Transaction Only |
| User C | Money Manager | Transaction, Payment |
| User D | Money Manager | Transaction, Payment, BillPay, FundTransfer |

The above example control access to the Money Manager service and what privileges within the service a given user can perform. This will be used by the Client (mobile application) to enable/disable available features on the Client.

In one implementation, when a user subscribes to a mobile wallet the user is assigned credentials that include a unique WalletID, SiteKey, a user-defined PIN, as well as tokens that specify access and privileges for the different services. FIG. 3 illustrates one implementation of a method 300 for authenticating a user. User input is received (through a mobile communication device) logging into the mobile application service (step 302). In one implementation, when a user attempts to login with the client, the user is prompted to enter login credentials (e.g., mobile phone number, 1-time activation code, Wallet PIN, etc.). A session key is generated (step 304). In one implementation, the session key is a unique server-generated session key that is valid only for the duration of a given session. In one implementation, the session key is used to ensure the server can identify the client and ensure that the client has been previously authenticated. Upon a successful login, the server will transfer credentials, service access and privileges (step 306), which are locally cached on the mobile communication device. The service access and privileges control the behavior of the client. In one implementation, to prevent command spoofing, the session key is passed in every API server call. The server will validate (every time) the session key is valid. If valid, the API server call is processed. Failure to validate the session key will cause a failure. In such a case, the client will flush the cached PIN and force the user to re-authenticate (or re-login).

Remote Lock

In one implementation, a mobile application running on a mobile communication device can be remotely locked (or disabled) by invalidating a session key. Users, via calling a Customer Care, a personal web portal, or some other mechanism, can implement changes (e.g., change PIN, etc.) that causes the server to invalidate the session key. In real-time, the next attempt by the client to issue an API server call, validation of the session key will fail, which (in one implementation) causes the client to automatically flush the cached PIN and session key, and force the user to re-authenticate. In addition, the client can perform additional actions, in addition to flushing the cached PIN and session key. This includes, but is not limited to, one or more of the following: changing the secure element mode to effective temporarily or permanently disable the secure element—i.e., a user can remotely alter the state of the smart chip to lock it remotely; and deleting all cached data stored in the memory (or disk) of the mobile communication device.

Session Time Out

In one implementation, while a client is open, a user has access to transaction data. In such an implementation, users who may misplace a mobile communication device while the client is open may expose the user to risk of information theft. Therefore, in one implementation, mobile application (or client) shuts down after a period of inactivity. Additional tasks that can be associated with the shutdown procedure can include, but is not limited to, temporarily shutting down a secure element (of the mobile communication device) to prevent NFC payments, NFC coupon redemption, and NFC ticket redemption.

Payment Limit PIN

For payments (mobile commerce ticket purchase, etc.), in one implementation a user can prevent either fraudulent purchases or accidental purchases by forcing a PIN prompt when a purchase amount exceed a user-specified value. In one implementation, a user can control this behavior globally (e.g., across all users' payment methods) or on a per-payment-method basis. Thus, when a user purchases ticket and selects a payment method (to pay for purchase), if the transaction amount exceeds a specified payment method's limit, the client will trigger and prompt for the PIN. In order to proceed with purchase, the user has to enter the correct PIN. The user's input is validated against the cached PIN on the client. The payment transaction will proceed if validated. Otherwise, an appropriate response is generated to the user. Effectively, this is a mechanism for the user (not the Merchant or Issuing Bank) to throttle/control the dollar amount that can be authorized for various payments and transactions. In the event of a contactless purchase, the client controls the smart chip. In the event of an electronic purchase (ticketing, etc.), a server can manages the controls.

Local Storage of Payment Security Codes

As a convenience to users, a user can opt-in and have only the security codes (CVV, etc.) associated to each of their payment methods locally stores on the client. In one implementation, management tools are provided to add/delete/edit these security codes. In one implementation, the security codes are encrypted (Key Management of encryption key performed by a server) and then only stored in the client on the mobile communication device. In one implementation, security codes are not stored in any form on the server. The encryption key and security codes can be kept separately to prevent fraudulent usage.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

What is claimed is:

1. A method for conducting a mobile banking transaction using a server, the method comprising:
    maintaining, at the server, a payment method;
    receiving, at the server, user input login information from a non-browser based application stored on a mobile device, wherein the non-browser based application stored on the mobile device receives the user input login information via a mobile device display of the mobile device, wherein the non-browser based application is a mobile operating system platform based application with a graphical user interface that is downloaded and installed on the mobile device, wherein the graphical user interface includes a graphical icon; the mobile device including the mobile device display, a mobile device memory, a mobile device processor, a mobile device radio transceiver that supports voice and data interactions through a first wireless communication channel using at least one of GSM or CDMA, and a mobile device wireless fidelity (Wi-Fi) interface;
    upon receipt of the user input login information, authenticating at the server a user of the mobile device associated with the user input login information prior to conducting the mobile banking transaction;
    receiving at the server user input from the non-browser based application to initiate a mobile banking transaction request including an identification code associated with the user, wherein the non-browser based application stored on the mobile device receives user input via the mobile device display of the mobile device;
    after receiving the mobile banking transaction request including the identification code associated with the user, processing at the server the mobile banking transaction using the payment method that corresponds to the identification code associated with the user; and
    after the mobile banking transaction has been processed, sending, from the server, a digital artifact to the non-browser based application.

2. The method of claim 1, wherein the mobile banking transaction comprises a bill payment.

3. The method of claim 1, wherein the mobile banking transaction comprises a funds transfer.

4. The method of claim 1, wherein the mobile banking transaction comprises loading funds.

5. The method of claim 1, wherein the digital artifact is a receipt, ticket, coupon, advertisement, or content.

6. The method of claim 1, wherein the user input login information includes biometric data or a personal identification number (PIN).

7. The method of claim 1, further wherein the digital artifact is cached on the mobile communication device and can be accessed by the non-browser based application when there is no network connection.

8. The method of claim 1, wherein upon the condition that the mobile device loses connection with a wireless network, the non-browser based application monitors for access to the wireless network and automatically reconnects to the wireless network when the wireless network is available.

9. The method of claim 1, further wherein no sensitive data is stored on the mobile device, wherein the sensitive data comprises at least one of information related to the payment method, information related to a PIN associated with the user input login information, and information related to an expiration dates associated with the payment method.

10. The method of claim 1, further wherein the non-browser based application shuts down due to a period of inactivity, wherein the period of inactivity means the non-browser based application has not received input at the non-browser based application.

11. The method of claim 1, further wherein the server is configured to store a single identification code associated with the user.

12. A system for conducting a mobile banking transaction using a server comprising:
    a mobile device including;
    a mobile device display;
    a mobile device processor;
    a mobile device memory that maintains a non-browser based application, wherein the non-browser based application is a mobile operating system platform based application with a graphical user interface that is downloaded and installed on the mobile device, wherein the graphical user interface includes a graphical icon;
a mobile device radio transceiver that supports voice and data interactions through a first wireless communication channel using at least one of GSM or CDMA; and a mobile device wireless fidelity (Wi-Fi) interface.
the server including:
a server memory that maintains a payment method;
a server transceiver that
receives user input login information from a the non-browser based application stored on a the mobile device, wherein the non-browser based application stored on the mobile device receives the user input login information via the mobile device display of the mobile device; and
receives user input into from the non-browser based application to initiate a mobile banking transaction request including an identification code associated with the user, wherein the non-browser based application stored on the mobile device receives the user input via the mobile device display of the mobile device; and
after the mobile banking transaction has been processed, sends a digital artifact to the non-browser based application;
a server processor that
upon receipt of the user input login information, authenticates a user of the mobile device associated with the user input login information prior to conducting the mobile banking transaction; and
after receiving the mobile banking transaction request including the identification code associated with the user, processes the mobile banking transaction using the payment method that corresponds to the identification code associated with the user.

13. The system of claim 12, wherein the mobile banking transaction comprises a bill payment.

14. The system of claim 12, wherein the mobile banking transaction comprises a funds transfer.

15. The system of claim 12, wherein the mobile banking transaction comprises loading funds.

16. The system of claim 12, wherein the digital artifact is a receipt, ticket, coupon, advertisement, or content.

17. The system of claim 12, wherein the user input login information includes biometric data or a personal identification number (PIN).

18. The system of claim 12, further wherein the digital artifact is cached on the mobile communication device and can be accessed by the non-browser based application when there is no network connection.

19. The system of claim 12, wherein upon the condition that the mobile device loses connection with a wireless network, the non-browser based application monitors for access to the wireless network and automatically reconnects to the wireless network when the wireless network is available.

20. The system of claim 12, further wherein no sensitive data is stored on the mobile device, wherein the sensitive data comprises at least one of information related to the payment method, information related to a PIN associated with the user input login information, and information related to an expiration dates associated with the payment method.

21. The system of claim 12, further wherein the non-browser based application shuts down due to a period of inactivity, wherein the period of inactivity means the non-browser based application has not received input at the non-browser based application.

22. The system of claim 12, further wherein the server is configured to store a single identification code associated with the user.

23. A non-transitory computer readable medium for conducting a mobile banking transaction using a server, comprising:
computer code for maintaining, at the server, a payment method;
computer code for receiving, at the server, user input login information from a non-browser based application stored on a mobile device, wherein the non-browser based application stored on the mobile device receives the user input login information via a mobile device display of the mobile device; ,wherein the non-browser based application is a mobile operating system platform based application with a graphical user interface that is downloaded and installed on the mobile device, wherein the graphical user interface includes a graphical icon, the mobile device including the mobile device display, a mobile device memory, a mobile device processor, a mobile device radio transceiver that supports voice and data interactions through a first wireless communication channel using at least one of GSM or CDMA, and a mobile device wireless fidelity (Wi-Fi) interface;
computer code for upon receipt of the user input login information, authenticating at the server, a user of the mobile device associated with the user input login information prior to conducting the mobile banking transaction;
computer code for receiving at the server, user input from non-browser based application to initiate a mobile banking transaction request including an identification code associated with the user, wherein the non-browser based application stored on the mobile device receives the user input via a mobile device display of the mobile device;
computer code for after receiving the mobile banking transaction request including the identification code associated with the user, processing at the server the mobile banking transaction using the payment method that corresponds to the identification code associated with the user; and
computer code for after the mobile banking transaction has been processed, sending, from the server, a digital artifact to the non-browser based application.

\* \* \* \* \*